United States Patent
Shen et al.

(10) Patent No.: US 11,827,848 B2
(45) Date of Patent: Nov. 28, 2023

(54) TREATING SUBTERRANEAN FORMATIONS USING SALT TOLERANT SUPERABSORBENT POLYMER PARTICLES

(71) Applicant: Halliburton Energy Services, Inc., Houston, TX (US)

(72) Inventors: Dong Shen, The Woodlands, TX (US); Hong Sun, Houston, TX (US); Larry Steven Eoff, Porter, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 17 days.

(21) Appl. No.: 16/577,687

(22) Filed: Sep. 20, 2019

(65) Prior Publication Data

US 2021/0087460 A1 Mar. 25, 2021

(51) Int. Cl.
*C09K 8/68* (2006.01)
*E21B 43/267* (2006.01)
*C09K 8/80* (2006.01)

(52) U.S. Cl.
CPC ............... *C09K 8/685* (2013.01); *C09K 8/80* (2013.01); *E21B 43/267* (2013.01)

(58) Field of Classification Search
CPC .......... C09K 8/685; C09K 8/80; E21B 43/267
See application file for complete search history.

(56) References Cited

U.S. PATENT DOCUMENTS

| | | | |
|---|---|---|---|
| 9,120,965 B2 | 9/2015 | Kurian et al. | |
| 9,809,742 B2 | 11/2017 | Zhou et al. | |
| 9,828,844 B2 | 11/2017 | Zhou et al. | |
| 10,138,418 B2 | 11/2018 | Zhou et al. | |
| 2011/0095227 A1* | 4/2011 | Herth | C04B 28/02 252/194 |
| 2012/0231980 A1 | 9/2012 | Zhang et al. | |
| 2014/0000891 A1* | 1/2014 | Mahoney | C09K 8/805 507/224 |
| 2016/0177693 A1* | 6/2016 | Gomaa | C09K 8/62 166/250.07 |
| 2016/0347985 A1* | 12/2016 | Li | C09K 8/508 |
| 2017/0267915 A1 | 9/2017 | Volk et al. | |
| 2018/0044579 A1* | 2/2018 | Zhou | C09K 8/805 |
| 2018/0306006 A1 | 10/2018 | Gupta et al. | |
| 2019/0100690 A1 | 4/2019 | Kurian et al. | |

OTHER PUBLICATIONS

Hong Sun et al., "Case Study of Soft Particle Fluid to Improve Proppant Transport and Placement"; SPE-174801-MS, SPE Annual Technical Conference and Exhibition—2015 (16 pages).

(Continued)

*Primary Examiner* — Crystal J. Lee (74) *Attorney, Agent, or Firm* — Thomas Rooney; C. Tumey Law Group PLLC (57) ABSTRACT

Methods and compositions for treating subterranean formations with fluids containing superabsorbent polymer particles are provided. In one embodiment, the methods comprise introducing a treatment fluid into a well bore penetrating at least a portion of a subterranean formation, the treatment fluid including an aqueous base fluid, and one or more superabsorbent polymer particles comprising a plurality of monomers and one or more crosslinkers wherein at least one crosslinker is a labile crosslinker.

16 Claims, 2 Drawing Sheets

(56) References Cited

OTHER PUBLICATIONS

Jia Zhou et al., "Nearly Perfect Proppant Transport by Particle Fracturing Fluids Yields Exciting Opportunities in Well Completion Applications"; SPE-174267-MS-SPE European Formation Damage Conference and Exhibition, Jun. 3-5, Budapest, Hungary—2015 (10 pages).
International Search Report and Written Opinion issued in related PCT Application No. PCT/US2019/052552 dated Jun. 12, 2020, 13 pages.

* cited by examiner

TREATING SUBTERRANEAN FORMATIONS USING SALT TOLERANT SUPERABSORBENT POLYMER PARTICLES

BACKGROUND

The present disclosure relates to methods and compositions for treating subterranean formations, and more specifically, relates to methods and compositions related to treatment fluids containing superabsorbent polymer particles for use in treating subterranean formations.

Hydrocarbon producing wells (e.g., oil producing, wells, gas producing wells, and the like) are created and stimulated using various treatment fluids introduced into the wells to perform a number of subterranean formation operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like. For example, a fluid may be used to drill a well bore in a subterranean formation or to complete a well bore in a subterranean formation, as well as numerous other purposes.

In hydraulic fracturing treatments, a viscous fracturing fluid, which also may function as a carrier fluid, is pumped into a producing zone of the subterranean formation to be fractured at a rate and pressure such that one or more fractures are formed in the zone. Continuing to pump fracturing fluid will result in dilation and propagation of the fracture deep into the formation. Particulate solids for propping open the fractures, commonly referred to in the art as "proppant," are generally suspended in at least a portion of the fracturing fluid so that the particulate solids are deposited in the fractures when the fracturing fluid flows back as a low viscosity broken fluid to the surface. The fracturing fluid generally should achieve and maintain a sufficient viscosity in order to properly suspend, transport, and deposit proppant in fractures. The proppant deposited in the fractures prevents the fractures from fully closing and maintains conductive channels through which produced hydrocarbons can flow. By keeping the fractures from fully closing, the proppant particulates form a proppant pack having interstitial spaces that act as conductive paths through which fluids produced from the formation may flow. As used herein, the term "proppant pack" refers to a plurality of proppant particulates in a fracture, thereby forming a "propped fracture."

BRIEF DESCRIPTION OF THE DRAWINGS

These drawings illustrate certain aspects of some of the embodiments of the present disclosure and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to methods and compositions for treating subterranean formations. More particularly, the present disclosure relates to methods and compositions related to treatment fluids containing superabsorbent polymer particles for use in treating subterranean formations.

As used herein, the term "superabsorbent polymer particles" refers to one or more polymeric particles that are capable of expanding at least twice the diameter of their unexpanded particle size due to the absorption of significant amounts of water. The methods and compositions of the present disclosure may generally comprise a treatment fluid including an aqueous base fluid, one or more proppant particulates, and one or more superabsorbent polymer particles comprising a plurality of monomers, one or more crosslinkers and including at least one labile crosslinker, wherein the superabsorbent polymer particles are capable of swelling to an expanded state.

Among the many potential advantages to the methods and compositions of the present disclosure, only some of which are alluded to herein, the methods, compositions, and systems of the present disclosure may improve proppant suspension in salt water based fracturing fluids. In some embodiments, the methods, compositions, and systems of the present disclosure may improve proppant transportation in salt water based fracturing fluids. In some embodiments, the methods, compositions, and systems of the present disclosure may enhance transverse and vertical placement of proppant particulates in fractures. In some embodiments, the methods, compositions, and systems of the present disclosure may increase propped fracture area when using salt water based fracturing fluids. In some embodiments, the methods, compositions, and systems of the present disclosure may provide improved expansion of polymer particles in salt water based fracturing fluids. In some embodiments, the methods, compositions, and systems of the present disclosure may improve performance and/or increase cost efficiency in water shutoff operations.

In one or more embodiments, the treatment fluids of the present disclosure may be used to treat at least a portion of a subterranean formation. Such treatment fluids may include, but are not limited to, drilling fluids, completion fluids, gravel pack fluids, loss circulation fluids, pills, fracturing fluids, plugging fluids, cementing fluids, and abandonment fluids. The treatment fluids used in the methods and compositions of the present disclosure may include any aqueous base fluid known in the art. The term "base fluid" refers to the major component of the fluid (as opposed to components dissolved and/or suspended therein), and does not indicate any particular condition or property of that fluid such as its mass, amount, pH, etc. Aqueous fluids that may be suitable for use in the methods and compositions of the present disclosure may include water from any source. Such aqueous fluids may include fresh water, salt water (e.g., water containing one or more salts dissolved therein), brine (e.g., saturated salt water), seawater, or any combination thereof. In most embodiments of the present disclosure, the aqueous fluids include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. In certain embodiments, the treatment fluids may include a mixture of one or more fluids and/or gases, including but not limited to emulsions, foams, and the like.

The treatment fluids used in the methods and compositions of the present disclosure may comprise one or more superabsorbent polymer particles. In certain embodiments, the superabsorbent polymer particle used in the methods and compositions of the present disclosure may comprise a plurality of monomers, which may include any suitable monomers. In some embodiments, the plurality of monomers may comprise one or more types of monomers selected from the group consisting of acrylamide, acrylamide methylpropane sulfonate, acrylate, vinyl acetate, [2-(acryloyloxy)ethyl]trimethylammonium chloride (AETAC), methacrylamidopropyl trimethyl ammonium chloride (MAPTMAC), acrylamidopropyl trimethyl ammonium chloride (APTMAC), methacrylamido-4,4,8,8-tetramethyl-4,8-diaza-6-hydroxylnonamethylene dichloride (MDTHD), diallyldimethyl ammonium chloride (DADMAC), the like, any derivative thereof, and any combination thereof. In certain embodiments, two or more of the monomers may bond to form one or more polymer chains. In certain embodiments, each polymer chain may include a linear, branched, or hyperbranched polymer backbone having at least two ends. In certain embodiments, the polymer backbone of each polymer chain may have a length of at least 2,000 monomers and/or a polymer backbone having a weight average molar mass of equal to or greater than about 100,000 g/mol.

In certain embodiments, the superabsorbent polymer particles used in the methods and compositions of the present disclosure include one or more crosslinkers (which may also comprise monomers). In certain embodiments, the crosslinkers may be labile (reversible), non-labile, or a combination thereof. In certain embodiments, the crosslinker may crosslink one or more polymer chains of the superabsorbent polymer particle. In certain embodiments, the crosslinker may be present in the superabsorbent polymer particle in an amount from about 0.1% to 30% molar percentage of the overall superabsorbent polymer particle. Suitable crosslinkers include internal crosslinkers, surface crosslinkers, or a combination thereof. In certain embodiments, the performance of the crosslinker is consistent in a wide range of fluid salinities. In certain embodiments, performance of the crosslinker is not significantly limited by a fluid salinity above 5000 parts per million ("ppm") ppm of total dissolved solids ("TDS"). Examples of the labile crosslinkers used in the methods and compositions of the present disclosure may include, but are not limited to:

1.

2.

3.

4.

5.

6.

7.

8.

9.

10.

11.

12.

13.

14.

15.

16.

17.

18.

19.

20.

21.

22.

23.

24.

25.

26.

In certain embodiments, the labile crosslinker may be present in the superabsorbent polymer particle in an amount from about 0.1% to 30% molar percentage of the overall superabsorbent polymer particle. In some embodiments, suitable labile crosslinkers may be selected from at least one of structures 1-26, any derivative thereof, and any combination thereof. Suitable non-labile crosslinkers may include methylene bisacrylamide, diallylamine, triallylamine, divinyl sulfon, diethyleneglycol diallyl ether, the like, derivatives thereof, and combinations thereof. In certain embodiments, the non-labile crosslinker may be present in the superabsorbent polymer particle in an amount from about 0.1% to 30% molar percentage of the overall superabsorbent polymer particle. In certain embodiments, the non-labile crosslinker may be present in the particle an amount higher than the amount of labile crosslinker in the particle.

In one or more embodiments, the unexpanded particle size diameter of the superabsorbent polymer particles used in the methods and compositions of the present disclosure may be from about 5 microns to about 10,000 microns. In one or more embodiments, the unexpanded particle size diameter of the superabsorbent polymer particle may be from about 10 microns to about 400 microns. In one or more embodiments, the unexpanded particle size diameter of the superabsorbent polymer particle may be from about 15 microns to about 300 microns. In one or more embodiments, the unexpanded particle size diameter of the superabsorbent polymer particle may be from about 200 microns to about 350 microns. In one or more embodiments, the unexpanded particle size diameter of the superabsorbent polymer particle may be from about 300 microns to about 1,000 microns. In one or more embodiments, the unexpanded particle size diameter of the superabsorbent polymer particle may be from about 1,000 microns to about 5,000 microns. In one or more embodiments, the unexpanded particle size diameter of the superabsorbent polymer particle may be from about 5,000 microns to about 10,000 microns. In one or more embodiments, the unexpanded particle size diameter of the superabsorbent polymer particle may be from about 7,500 microns to about 8,500 microns. In one or more embodiments, the expanded particle size diameter of the superabsorbent polymer particles may be at least twice the diameter of unexpanded particle size diameter of the superabsorbent polymer particle.

In certain embodiments, expansion of the superabsorbent polymer particle is consistent in a wide range of fluid salinities. In certain embodiments, expansion of the superabsorbent polymer particle is not significantly limited by a fluid salinity above 5000 parts per million ("ppm") ppm of total dissolved solids ("TDS").

In one or more embodiments, the superabsorbent polymer particles used in the methods and compositions of the present disclosure may be present in the treatment fluid in an amount of about 5 to about 200 pounds per thousand gallon ("ppt") based on the total volume of the treatment fluid. In one or more embodiments, superabsorbent polymer particles used in the methods and compositions of the present disclosure may be present in the treatment fluid in an amount of about 20 to about 100 ppt based on the total volume of the treatment fluid. In one or more embodiments, the superabsorbent polymer particles used in the methods and compositions of the present disclosure may be present in the treatment fluid in an amount of about 100 to about 200 ppt based on the total volume of the treatment fluid. In one or more embodiments, the superabsorbent polymer particles used in the methods and compositions of the present disclosure may be present in the treatment fluid in an amount of about 10 to about 190 ppt based on the total volume of the treatment fluid. In one or more embodiments, the superabsorbent polymer particles used in the methods and compositions of the present disclosure may be present in the treatment fluid in an amount of about 95 to about 115 ppt based on the total volume of the treatment fluid. In one or more embodiments, the superabsorbent polymer particles used in the methods and compositions of the present disclosure may be present in the treatment fluid in an amount of about 30 to about 80 ppt based on the total volume of the treatment fluid. In one or more embodiments, the superabsorbent polymer particles used in the methods and compositions of the present disclosure may be present in the treatment fluid in an amount of about 53 to about 159 ppt based on the total volume of the treatment fluid. In one or more embodiments, the superabsorbent polymer particles used in the methods and compositions of the present disclosure may be present in the treatment fluid in an amount of about 67 to about 192 ppt based on the total volume of the treatment fluid. In one or more embodiments, the superabsorbent polymer particles used in the methods and compositions of the present disclosure may be present in the treatment fluid in an amount of about 105 to about 175 ppt based on the total volume of the treatment fluid.

In one or more embodiments, each crosslinker (labile and/or non-labile) of the superabsorbent polymer particles used in the methods and compositions of the present disclosure may be capable of crosslinking monomers of the superabsorbent polymer. In certain embodiments, the labile crosslinkers of the superabsorbent polymer particles within the aqueous fluid may be capable of uncrosslinking (e.g., via hydrolysis of ester or acetal linkages in the crosslinker), which, in turn, may affect the rheological properties (e.g., increase the viscosity) of the fluid by allowing the superabsorbent polymer particles to absorb the aqueous fluid and swell.

In certain embodiments, the crosslinks and/or bonds between monomers of the superabsorbent particles may be broken by exposing the crosslinks and/or bonds to a breaker. In certain embodiments, the labile crosslinks may be broken by exposing them to certain temperature conditions and/or pH conditions. In certain embodiments, the labile crosslinks may be broken by introducing a chemical breaker (e.g., acids, oxidizers, bases, certain ions, enzymes) into the fluid containing the superabsorbent polymer particles. In certain embodiments, the non-labile crosslinks may be broken by introducing a chemical breaker (e.g., acids, oxidizers, bases, certain ions, enzymes) into the fluid containing the superabsorbent polymer particles. In certain embodiments, the bonds between monomers of a superabsorbent particle (expanded or unexpanded) may be broken by introducing a chemical breaker (e.g., acids, oxidizers, bases, certain ions, enzymes) into the fluid containing the superabsorbent polymer particles. In some embodiments, a combination of breaking methods may be used.

In certain embodiments, the treatment fluids used in the methods and compositions of the present disclosure optionally may include any number of additional additives. Examples of such additional additives include, but are not limited to, salts, surfactants, acids, diverting agents, fluid loss control additives, gas, nitrogen, carbon dioxide, surface modifying agents, tackifying agents, foamers, corrosion inhibitors, scale inhibitors, paraffin inhibitors, asphaltene inhibitors, gas hydrate inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a viscosifying agent) may be added to the treatment fluid and/or activated after the viscosifying agent has been at least partially hydrated in the fluid. A person skilled in the art, with the benefit of this disclosure, will recognize the types of additives that may be included in the fluids of the present disclosure for a particular application.

In certain embodiments, the treatment fluids of the present disclose may include one or more proppant particulates. Examples of materials that may be suitable for use as proppant particulates in certain embodiments of the present disclosure include, but are not limited to, fly ash, silica, alumina, fumed carbon (e.g., pyrogenic carbon), carbon black, graphite, mica, titanium dioxide, metalsilicate, silicate, kaolin, talc, zirconia, boron, hollow microspheres (e.g., spherical shell-type materials having an interior cavity), glass, sand, bauxite, sintered bauxite, ceramic, calcined clays (e.g., clays that have been heated to drive out volatile materials), partially calcined clays (e.g., clays that have been heated to partially drive out volatile materials), composite polymers (e.g., thermoset nanocomposites), halloysite clay nanotubes, and any combination thereof. The proppant particulates may be of any shape (regular or irregular) suitable or desired for a particular application. In some embodiments, the proppant particulates may be round or spherical in shape, although they may also take on other shapes such as ovals, capsules, rods, toroids, cylinders, cubes, or variations thereof. In certain embodiments, the proppant particulates of the present disclosure may be relatively flexible or deformable, which may allow them to enter certain perforations, microfractures, or other spaces within a subterranean formation whereas solid particulates of a similar diameter or size may be unable to do so.

In certain embodiments, the treatment fluid may include proppant particulates in an amount from about 0.05 to about 12 pounds of particulates/gallon of treatment fluid (ppg). In other embodiments, the treatment fluid may include the proppant particulates in an amount from about 3 ppg to about 10 ppg. In other embodiments, the treatment fluid may include the proppant particulates in an amount from about 0.1 ppg to about 0.5 ppg, in other embodiments, about 0.5 ppg to about 1.0 ppg, in other embodiments, about 1.0 ppg to about 2.0 ppg, in other embodiments, about 2.0 ppg 30 to about 3.0 ppg, in other embodiments, about 3.0 ppg to about 4.0 ppg, in other embodiments, about 4.0 ppg to about 5.0 ppg, in other embodiments, about 5.0 ppg to about 6.0 ppg, in other embodiments, about 6.0 ppg to about 7.0 ppg, in other embodiments, about 7.0 ppg to about 8.0 ppg, in other embodiments, about 8.0 ppg to about 9.0 ppg, and in other embodiments, about 9.0 ppg to about 10 ppg.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the superabsorbent polymer particles and/or other components of the treatment fluid may be metered directly into abase fluid to forma treatment fluid. In certain embodiments, the base fluid may be mixed with the superabsorbent polymer particles and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

The present disclosure in some embodiments provides methods for using the treatment fluids to carry out a variety of subterranean treatments, including but not limited to, hydraulic fracturing treatments, acidizing treatments, and drilling operations. In some embodiments, the treatment fluids of the present disclosure may be used in treating a portion of a subterranean formation, for example, in acidizing treatments such as matrix acidizing or fracture acidizing. In certain embodiments, a treatment fluid may be introduced into a subterranean formation. In some embodiments, the treatment fluid may be introduced into a well bore that penetrates a subterranean formation. In some embodiments, the treatment fluid may be introduced at a pressure sufficient to create or enhance one or more fractures within the subterranean formation (e.g., hydraulic fracturing).

In some embodiments, the treatment fluid further including an acid may be introduced at a pressure sufficient to cause at least a portion of the treatment fluid to penetrate at least a portion of the subterranean formation, and the treatment fluid may be allowed to interact with the subterranean formation so as to create one or more voids in the subterranean formation (e.g., in acidizing treatments). Introduction of the treatment fluid may in some of these embodiments be carried out at or above a pressure sufficient to create or enhance one or more fractures within the subterranean formation (e.g., fracture acidizing). In other embodiments, introduction of the treatment fluid may be carried out at a pressure below that which would create or enhance one or more fractures within the subterranean formation (e.g., matrix acidizing). In other embodiments, the treatment fluid may be introduced to divert a flow path of fluid from at least a portion of a fractured formation to reduce water/gas production in production wells (e.g., water and/or gas shut-off) or to provide profile modification in injection wells (e.g., conformance control treatment). In other embodiments, the treatment fluid may be introduced during cementing or drilling operations as a component of lost circulation control.

In certain embodiments, the treatment fluid may be introduced into a subterranean formation in an effective amount for modifying the permeability of fractures in the subterranean formation. In certain embodiments, the treatment fluid may increase in viscosity to form a gel mass, which may divert a flow path of fluid from at least a portion of the fractures. As used herein, the term "gel mass" refers to expanded superabsorbent polymer particles in an aqueous-based fluid. In certain embodiments, the treatment fluid may suspend one or more proppant particulates. In certain embodiments, the gel mass may have a relatively low permeability to water and/or other treatment fluids. In certain embodiments, the gel mass may create a barrier to the flow of water and/or other treatment fluids in the zone containing the treatment fluid. In certain embodiments, the gel mass may be broken to a low viscosity fluid that flows out of the fractures.

In certain embodiments, the gel mass may be introduced with one or more proppant particulates to fractures formed in a subterranean formation. In certain embodiments, the gel mass may transport one or more proppant particulates to the fractures. In certain embodiments, the gel mass may deposit one or more proppant particulates in the fractures. In certain embodiments, the gel mass may be broken to a low viscosity fluid which deposits the one or more proppant particulates in the fractures and subsequently flows out of the fractures.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may include water, a hydrocarbon fluid, a polymer gel, foam, air, wet gases and/or other fluids.

Figure 1:
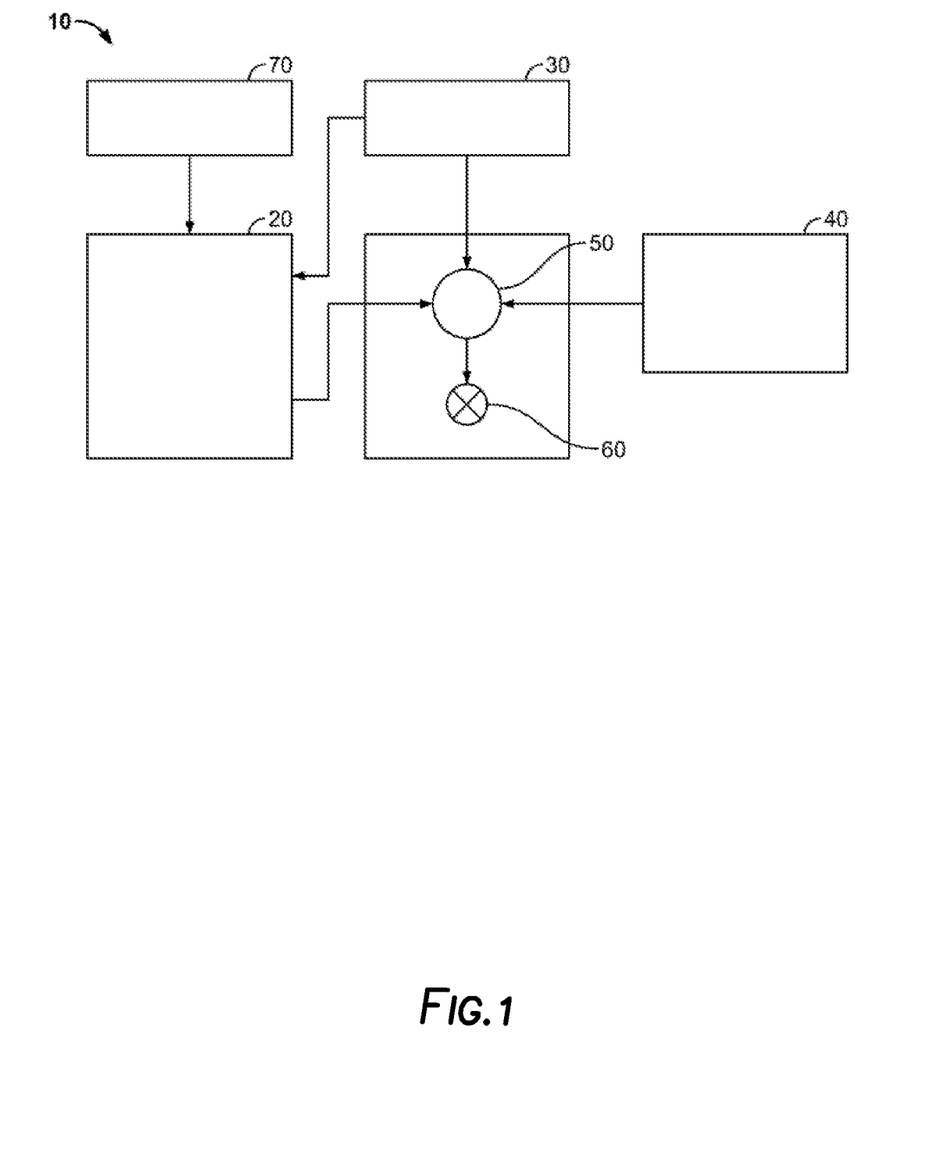
FIG. 1 is a diagram illustrating an example of a fracturing system that may be used in accordance with certain embodiments of the present disclosure.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions. In certain embodiments, the other additives 70 may include one or more treatment particulates of the present disclosure.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some, or all of the different sources at a given time and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
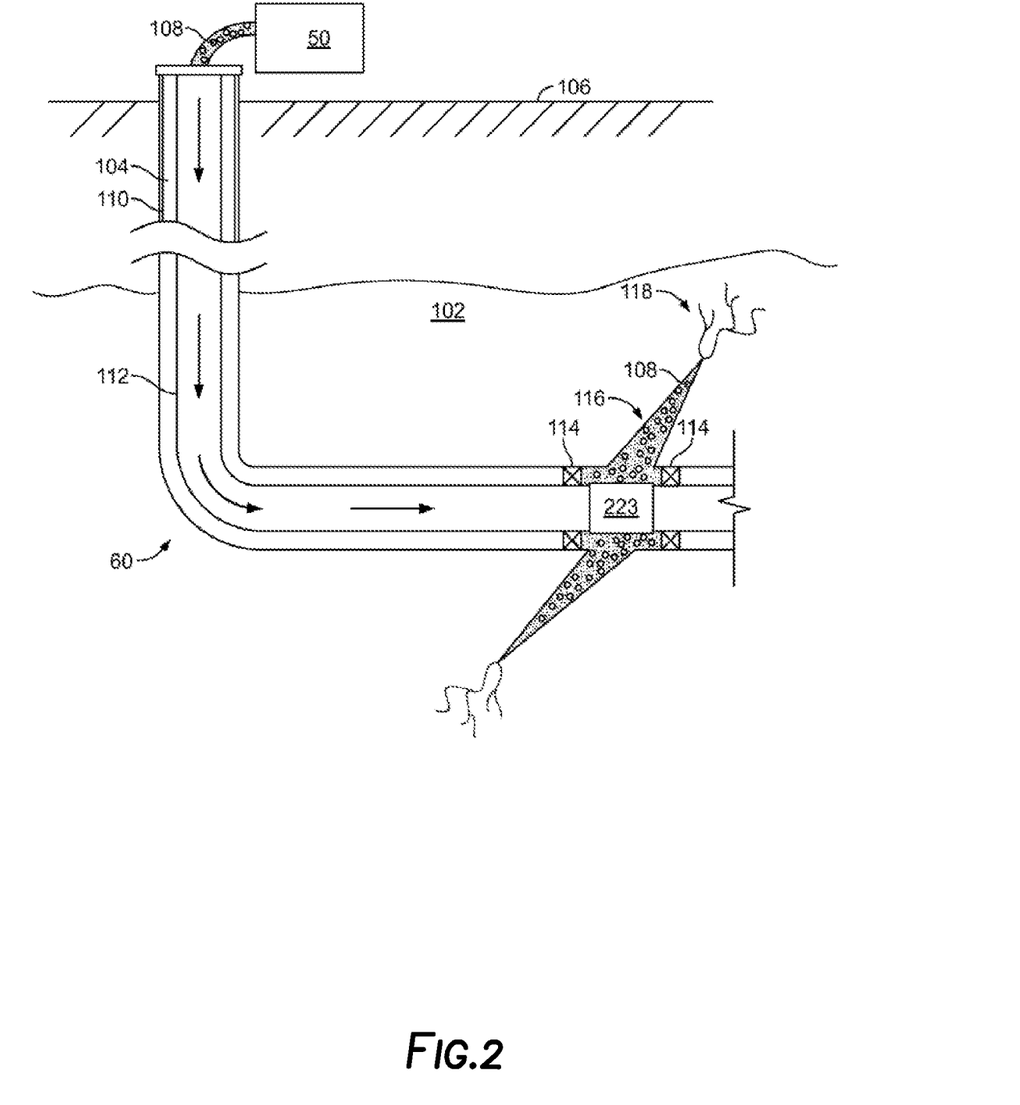
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the treatment fluid 108 (e.g., a fracturing fluid) is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting, and/or other tools.

The well is shown with a work string 112 depending from the surface 106 into the well bore 104. The pump and blender system 50 is coupled to the work string 112 to pump the treatment fluid 108 into the well bore 104. The work string 112 may include coiled tubing, jointed pipe, and/or other structures that allow fluid to flow into the well bore 104. The work string 112 can include flow control devices, bypass valves, ports, and or other tools or well devices that control fluid flow from the interior of the work string 112 into the subterranean zone 102. For example, the work string 112 may include ports adjacent the well bore wall to communicate the treatment fluid 108 directly into the subterranean formation 102, and/or the work string 112 may include ports that are spaced apart from the well bore wall to communicate the treatment fluid 108 into an annulus in the well bore between the working string 112 and the well bore wall.

The work string 112 and/or the well bore 104 may include one or more sets of packers 114 that seal the annulus between the work string 112 and well bore 104 to define an interval of the well bore 104 into which the treatment fluid 108 will be pumped. FIG. 2 illustrates two packers 114, one defining an uphole boundary of the interval and one defining the downhole end of the interval.

In certain embodiments, the treatment fluid 108 may be introduced into the well bore 104 at or above at or above a certain hydraulic pressure. In such embodiments, when the treatment fluid 108 is pumped into the desired interval of the well bore 104 at or above a certain hydraulic pressure, the rock of the subterranean zone 102 "fractures," in that one or more fractures or cracks are created in the zone 102 or one or more existing fractures or cracks in the zone 102 are enlarged or enhanced. In the embodiments shown, the rock matrix of the subterranean zone 102 is of a type that, when fractured, produces both a primary fracture 116 in the near field and secondary fractures 118 (e.g., induced, dendritic fractures or microfractures) in the far field. The secondary fractures 118 have propagated from or near the ends and edges of the primary fracture 116. In certain instances, the subterranean zone 102 is a low permeability zone having a permeability of 1 mD or less. For example, the subterranean zone 102 can include a shale, tight gas, clay, and/or coal bed formation. In certain instances, the rock matrix of the subterranean zone 102 may include cleating or natural fractures (i.e., those that existed prior to, and were not caused by, a fracture treatment). The natural fractures tend to run generally in a direction that is parallel to the primary fracture 116. The secondary fractures 118 run in many directions including directions non-parallel and, in certain instances, perpendicular to the direction of the primary fracture 116. As a result, the secondary fracture 118 can cross, and thereby link, the natural fractures to the primary fracture 116. In certain embodiments, the proppant particulates in the treatment fluid 108 may enter and/or be deposited within one or more of the primary fractures 116 and/or the secondary fractures 118, where they may remain after the treatment fluid flows out of the well bore. These proppant particulates may "prop" fractures 116 and 118 such that fluids may flow more freely through the fractures 116 and 118.

An embodiment of the present disclosure is a treatment fluid including an aqueous base fluid; one or more proppant particulates, and one or more superabsorbent polymer particles comprising a plurality of monomers, and one or more crosslinkers wherein at least one crosslinker is a labile crosslinker. In some embodiments, the treatment fluid may further include one or more breakers. In some embodiments, the treatment fluid may include a salinity greater than 5000 parts per million ("ppm") of total dissolved solids ("TDS"). In some embodiments, the treatment fluid may further include one or more additives selected from the group consisting of a salt, a surfactant, an acid, a diverting agent, a fluid loss control additive, a gas, nitrogen, carbon dioxide, a surface modifying agent, a tackifying agent, a foamer, a corrosion inhibitor, a scale inhibitor, a paraffin inhibitor, an asphaltene inhibitor, a gas hydrate inhibitor, a catalyst, a clay control agent, a biocide, a friction reducer, an antifoam agent, a bridging agent, a flocculant, an $H_2S$ scavenger, a $CO_2$ scavenger, an oxygen scavenger, a lubricant, a viscosifier, a weighting agent, a relative permeability modifier, a resin, a wetting agent, a coating enhancement agent, a filter cake removal agent, an antifreeze agents, and any combination thereof. In some embodiments, the plurality of monomers are selected from the group consisting of an acrylamide, an acrylamide methylpropane sulfonate, an acrylate, a vinyl acetate, [2-(acryloyloxy)ethyl]trimethylammonium chloride (AETAC), methacrylamidopropyl trimethyl ammonium chloride (MAPTMAC), acrylamidopropyl trimethyl ammonium chloride (APTMAC), methacrylamido-4,4,8,8-tetramethyl-4,8-diaza-6-hydroxylnonamethylene dichloride (MDTHD), diallyldimethyl ammonium chloride (DADMAC), any derivative thereof, and any combination thereof. In some embodiments, the one or more superabsorbent polymer particles are present in the treatment fluid in an amount of 5 to about 200 pounds per thousand gallons based on a total volume of the treatment fluid. In some embodiments, the labile crosslinker is present in the superabsorbent polymer particles in an amount from about 0.1% to 30% molar percentage of the superabsorbent polymer particle.

Another embodiment of the present disclosure is a method including introducing a treatment fluid into a well bore penetrating at least a portion of a subterranean formation, the treatment fluid including an aqueous base fluid and one or more superabsorbent polymer particles comprising a plurality of monomers and one or more crosslinkers wherein at least one crosslinker is a labile crosslinker. In some embodiments, the treatment fluid further includes one or more proppant particulates. In some embodiments, the method further includes contacting the treatment fluid with one or more breakers. In some embodiments, the treatment fluid has a salinity greater than 5000 ppm of TDS. In some embodiments, the method further includes using the treatment fluid to deposit the one or more proppant particulates into one or more fractures in the subterranean formation. In some embodiments, the plurality of monomers are selected from the group consisting of an acrylamide, an acrylamide methylpropane sulfonate, an acrylate, a vinyl acetate, [2-(acryloyloxy)ethyl]trimethylammonium chloride (AETAC), methacrylamidopropyl trimethyl ammonium chloride (MAPTMAC), acrylamidopropyl trimethyl ammonium chloride (APTMAC), methacrylamido-4,4,8,8-tetramethyl-4,8-diaza-6-hydroxylnonamethylene dichloride (MDTHD), diallyldimethyl ammonium chloride (DADMAC), any derivative thereof, and any combination thereof. In some embodiments, the one or more superabsorbent polymer particles are present in the treatment fluid in an amount of 5 to about 200 pounds per thousand gallons based on a total volume of the treatment fluid. In some embodiments, the method further includes allowing the one or more superabsorbent polymer particles to form a gel mass. In some embodiments, the method further includes allowing the gel mass to divert a flow path of fluid from at least a portion of the one or more fractures. In some embodiments, the treatment fluid is introduced at a pressure sufficient to create or enhance one or more fractures within the subterranean formation. In some embodiments, the labile crosslinker is present in the superabsorbent polymer particles in an amount from about 0.1% to 30% molar percentage of the superabsorbent polymer particle.

Another embodiment of the present disclosure is a method including providing a treatment fluid including an aqueous base fluid, one or more proppant particulates; and one or more superabsorbent polymer particles including a plurality of monomers and one or more crosslinkers wherein at least one crosslinker is a labile crosslinker; and introducing the treatment fluid into a wellbore penetrating at least a portion of a subterranean formation at a pressure sufficient to create or enhance one or more fractures within the subterranean formation. In some embodiments, the method further includes allowing the one or more one or more superabsorbent polymer particles to form a gel mass, thereby increasing the viscosity of the treatment fluid; disposing the one or more proppant particulates in the one or more fractures; and at least partially breaking the gel mass, thereby decreasing the viscosity of the treatment fluid.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A treatment fluid comprising:
an aqueous base fluid;
one or more proppant particulates; and
one or more superabsorbent polymer particles consisting of:
a plurality of monomers; and
a combination of crosslinkers comprising a labile crosslinker and a non-labile crosslinker,
wherein at least one or more of the labile crosslinker has the following structure:

Structure 1;
wherein at least one or more of the non-labile crosslinker is selected from the group consisting of methylene bisacrylamide, diallylamine, triallylamine, divinyl sulfone, diethyleneglycol diallyl ether, derivatives thereof, and combinations thereof; and
wherein the non-labile crosslinker is present in the one or more superabsorbent particles in an amount higher than the amount of the labile crosslinker in the one or more superabsorbent particles.

2. The treatment fluid of claim 1, further comprising one or more breakers.

3. The treatment fluid of claim 1, having a salinity greater than 5000 parts per million of total dissolved solids.

4. The treatment fluid of claim 1, wherein the treatment fluid further comprises one or more additives selected from the group consisting of a salt, a surfactant, an acid, a diverting agent, a fluid loss control additive, a gas, nitrogen, carbon dioxide, a surface modifying agent, a tackifying agent, a foamer, a corrosion inhibitor, a scale inhibitor, a paraffin inhibitor, an asphaltene inhibitor, a gas hydrate inhibitor, a catalyst, a clay control agent, a biocide, a friction reducer, an antifoam agent, a bridging agent, a flocculant, an $H_2S$ scavenger, a $CO_2$ scavenger, an oxygen scavenger, a lubricant, a viscosifier, a weighting agent, a relative permeability modifier, a resin, a wetting agent, a coating enhancement agent, a filter cake removal agent, an antifreeze agents, and any combination thereof.

5. The treatment fluid of claim 1, wherein the plurality of monomers are selected from the group consisting of an acrylamide, an acrylamide methylpropane sulfonate, an acrylate, a vinyl acetate, [2-(acryloyloxy)ethyl]trimethylammonium chloride (AETAC), methacrylamidopropyl trimethyl ammonium chloride (MAPTMAC), acrylamidopropyl trimethyl ammonium chloride (APTMAC), methacrylamido-4,4,8,8-tetramethyl-4,8-diaza-6-hydroxylnonamethylene dichloride (MDTHD), diallyldimethyl ammonium chloride (DADMAC), any derivative thereof, and any combination thereof.

6. The treatment fluid of claim 1, wherein the one or more superabsorbent polymer particles are present in the treatment fluid in an amount of 5 to about 200 pounds per thousand gallons based on a total volume of the treatment fluid.

7. A method comprising:
introducing a treatment fluid into one or more fractures of a wellbore penetrating at least a portion of a subterranean formation, the treatment fluid comprising:
an aqueous base fluid,
one or more superabsorbent polymer particles consisting of:
a plurality of monomers; and
one or more crosslinkers, wherein the one or more crosslinkers is a labile crosslinker having the following structure:

Structure 1; and crosslinking the one or more superabsorbent polymer particles using the labile crosslinker to increase the viscosity of the one or more superabsorbent polymer particles to form a gel mass.

8. The method of claim 7, wherein the treatment fluid further comprises one or more proppant particulates.

9. The method of claim 7, further comprising contacting the treatment fluid with one or more breakers.

10. The method of claim 7, wherein the treatment fluid has a salinity greater than 5000 ppm of total dissolved solids.

11. The method of claim 8, further comprising using the treatment fluid to deposit the one or more proppant particulates into one or more fractures in the subterranean formation.

12. The method of claim 7, wherein the plurality of monomers are selected from the group consisting of an acrylamide, an acrylamide methylpropane sulfonate, an acrylate, a vinyl acetate, [2-(acryloyloxy)ethyl]trimethylammonium chloride (AETAC), methacrylamidopropyl trimethyl ammonium chloride (MAPTMAC), acrylamidopropyl trimethyl ammonium chloride chloride (APTMAC), methacrylamido-4,4,8,8-tetramethyl-4,8-diaza-6-hydroxylnonamethylene dichloride (MDTHD), diallyldimethyl ammonium chloride (DADMAC), any derivative thereof, and any combination thereof.

13. The method of claim 7, wherein the one or more superabsorbent polymer particles are present in the treatment fluid in an amount of 5 to about 200 pounds per thousand gallons based on a total volume of the treatment fluid.

14. The method of claim 7, further comprising allowing the gel mass to divert a flow path of fluid from at least a portion of the one or more fractures.

15. The method of claim 7, wherein the treatment fluid is introduced at a pressure sufficient to create or enhance one or more fractures within the subterranean formation.

16. The method of claim 7, wherein the labile crosslinker is present in the superabsorbent polymer particles in an amount from about 0.1% to 30% molar percentage of the superabsorbent polymer particle.

* * * * *